Jan. 21, 1930. J. H. PFLAUM 1,744,414
GOLF BAG ATTACHMENT
Filed March 23, 1926
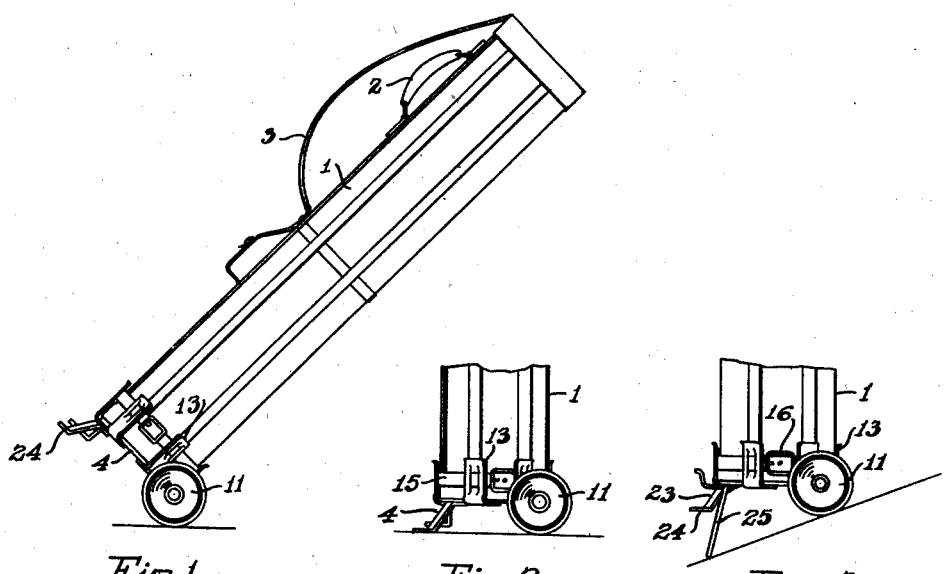
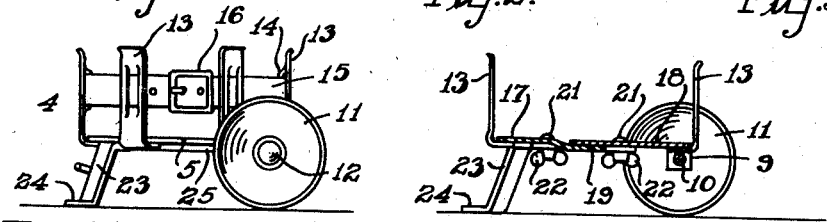
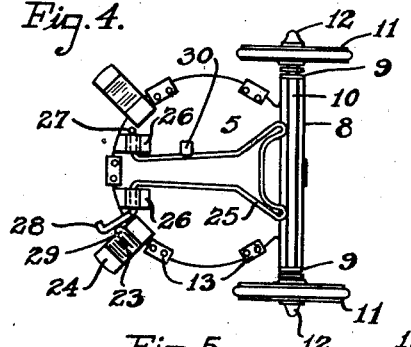
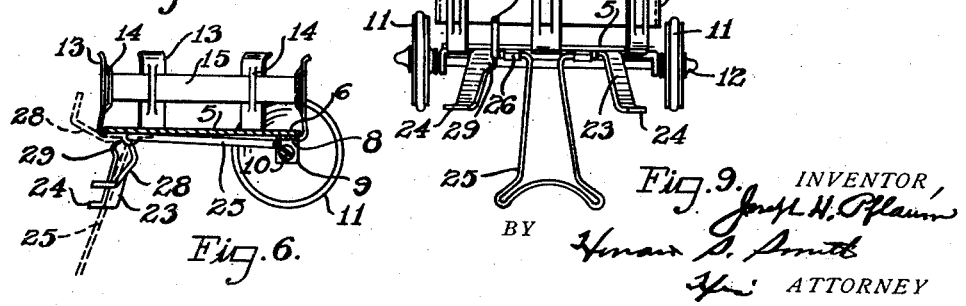

Patented Jan. 21, 1930

1,744,414

UNITED STATES PATENT OFFICE

JOSEPH H. PFLAUM, OF DAYTON, OHIO

GOLF-BAG ATTACHMENT

Application filed March 23, 1926. Serial No. 96,847.

This invention relates to new and useful improvements in golf bag attachments.

It is one of the principal objects of my invention to provide for golf bags, a wheeled carrier which is constructed to be easily and securely applied to the bottom portions of different sized bags by a strap or similar flexible means.

It is another object of my invention to provide on my wheeled golf bag carrier, two fixed legs and a third leg which is adapted to be turned from a horizontal position against the bottom of the carrier to a vertical position for the purpose of co-operating with the wheels in holding the bag perpendicularly on a hillside.

It is still another object of my invention to provide for the wheeled carrier an adjustable bottom to accommodate different sized bags.

Other important and incidental objects will be brought out in the following specification and particularly set forth in the subjoined claims.

In the accompanying drawings illustrating my invention, Figure 1 is a side elevational view of a golf bag to which my wheeled carrier has been applied, showing the position of the bag when being drawn over the ground on the carrier. Figure 2 is a side elevational view of the lower portion of the golf bag and wheeled carrier, showing how the latter is supported by the wheeled carrier in its perpendicular, stationary position on the ground. Figure 3 is a side elevational view of the lower portion of the golf bag and wheeled carrier, showing how the third leg of the carrier assists the wheels in supporting the bag in a perpendicular position on a hillside. Figure 4 is a side view of the wheeled carrier in its stationary position upon the ground. Figure 5 is a bottom view of the wheeled carrier, showing the third leg in its horizontal position. Figure 6 is a sectional view taken through the middle portion of the wheeled carrier, showing in dotted lines the third leg in its vertical position. Figure 7 is a bottom plan view of a modified form of wheeled carrier, showing an adjustable bottom to accommodate bags of different diameters. Figure 8 is a sectional view taken through said adjustable carrier on the line 8—8 of Figure 7. Figure 9 is a rear view of the wheeled carrier, showing the third leg in its vertical position.

Referring to the accompanying drawings for a detailed description of my invention, the numeral 1 designates a golf bag of a conventional type, having the usual carrying handle 2 and a shoulder strap 3.

For the golf bag 1 I have provided a wheeled carrier 4 having a bottom 5 formed in disc shape from suitable metal such as steel. This bottom 5 has formed at its rear end a flat tangential portion 6 to whose bottom surface a metal cross piece 8 having downwardly projecting right-angled ear ends 9, 9, is secured. Formed in the ears 9, 9 on this cross piece 8 are holes through which the ends of an axle 10 project. Mounted on the outer ends of this axle 10 are rubber tired wheels 11, 11 which are held in place upon said axle by cap pieces 12. (See Figures 1, 5 and 6).

Projecting upwardly at suitable distances apart from the carrier bottom 5, and having right-angled portions which are riveted to its under surface, are flat metal clips 13. Each clip 13 is formed at its middle portion with two vertical, parallel slots between which is left a middle integral slat 14. (See Figures 4 and 6.) Adapted to be passed through the slots in the clips 13 around the slats 14, is a strap 15 to one end of which there is secured a buckle 16 to receive the other end of the strap.

The carrier 4 is applied to the lower portion of the golf bag 1 by placing the latter on the disc shaped bottom 5 of the carrier between its upwardly projecting clips 13, after which the strap is pulled tight and its ends buckled together to cause the clips to firmly grip the bag.

In Figures 7 and 8 I have shown my carrier provided with a bottom made in two sections 17 and 18 that may be moved toward and away from each other to accommodate bags of different diameters. Each of these bottom sections is substantially segmental in shape, and projecting from the middle portion of the chord part of the section 17 is a depressed bifurcated extension 19, while free to move over its depressed portion and through a slot in its middle part is a narrow bifurcated extension 20 on the segmental section 18. By means of bolts 21 and thumb nuts 22 applied as shown in Figures 7 and 8, the bottom sections 17 and 18 may be held in their adjusted positions to cause their clips 13 to fit a golf bag of the diameter to which the carrier is to be applied.

Riveted or otherwise firmly secured to the front portion of the bottom 5 of the wheeled carrier 4, are the horizontal upper ends of two downwardly and outwardly inclined legs 23, 23 formed with feet 24, 24 respectively. These legs, together with the wheels 11, 11, support the carrier solidly on level ground. However, when it is desired to leave the bag in a perpendicular position on a hillside, for example, I have provided a third leg 25 which is longer than the other two.

Referring to Figures 3, 5, 6 and 9, this third leg 25 comprises a heavy wire which at its rear end is formed in Y shape, while its free ends are turned at right angles for passage through bearing brackets 26, 26 suitably secured to the carrier bottom 5 near the legs 23. One end of the wire, on the outside of its respective bearing bracket 26, is bent to form an angle portion 27 which engages the carrier bottom to act as a stop for the third leg 25 when it is turned to its extreme outer position shown in Figure 3. In this position, as shown in Figure 3, the third leg 25, projecting below the other two, will act as a front support for the bag to assist the wheels 11, 11 in holding it in a perpendicular position on the incline shown in said figure.

The other end of the wire forming the third leg 25 terminates in a plural-angle portion 28 which is received by a spring catch 29 on the adjacent leg 23 to firmly hold the third leg in its supporting position. (See Figures 5, 6 and 9).

For the purpose of holding the third leg 25 in its inner position against the carrier bottom 5, I have provided on the latter a spring clip 30 adapted to be easily turned over said leg. Or the Y shaped end of the third leg may be sprung against the axle 10 to securely hold it against the carrier bottom.

When it is desired to move the golf bag, it is inclined to the position shown in Figure 1, whereupon it may be easily pulled over the ground on the wheels 11, 11.

Having described my invention, I claim:

1. A carrier for a golf bag, comprising a bottom for attachment to said bag, a pair of wheels secured to one end of said bottom, a pair of fixed legs of equal length projecting downwardly from the other end of said bottom, and a third leg longer than the other two legs hingedly secured at one end against the under surface of said bottom, and adapted to be turned downwardly between the fixed legs to co-operate with the wheels in supporting the bag in a perpendicular position on an inclined surface.

2. A rolling carrier for a golf bag, comprising a bottom member and a plurality of flat spring clips projecting upwardly from said bottom member, to receive the lower portion of a golf bag, each clip being formed with a central pair of vertical slots between which an integral slat is left, a strap adapted to be passed through the slots of each clip around its central slat to draw the clips tightly against the lower portion of the bag, and means for securing the free ends of the strap together.

3. A carrier having a bottom for attachment to a golf club receptacle, rolling means on said bottom, legs on the latter to co-operate with the rolling means in holding the receptacle in an upright stationary position, and a third leg longer than the other legs adapted to be turned from a horizontal position to a vertical one to co-operate with the rolling means in holding the receptacle in a perpendicular position upon an inclined surface.

In witness whereof I have hereunto set my hand this 22d day of March, 1926.

JOSEPH H. PFLAUM.